US012634873B2

(12) United States Patent
Ciholas et al.

(10) Patent No.: US 12,634,873 B2
(45) Date of Patent: May 19, 2026

(54) SYSTEM AND METHOD FOR USING TIMING DATA FROM AN INCOMPLETE PACKET TO MORE ACCURATELY DETERMINE THE POSITION OF A TRANSMITTER

(71) Applicant: CIHOLAS, INC., Newburgh, IN (US)

(72) Inventors: Mike Ciholas, Evansville, IN (US); Justin Bennett, Newburgh, IN (US)

(73) Assignee: Ciholas, Inc., Newburgh, IN (US)

( * ) Notice: Subject to any disclaimer, the term of this patent is extended or adjusted under 35 U.S.C. 154(b) by 346 days.

(21) Appl. No.: 18/434,462

(22) Filed: Feb. 6, 2024

(65) Prior Publication Data

US 2024/0284378 A1     Aug. 22, 2024

Related U.S. Application Data

(60) Provisional application No. 63/446,216, filed on Feb. 16, 2023.

(51) Int. Cl.
*H04W 64/00* (2009.01)
*G01S 5/14* (2006.01)

(52) U.S. Cl.
CPC ............... *H04W 64/00* (2013.01); *G01S 5/14* (2013.01)

(58) Field of Classification Search
CPC .................................. H04W 64/00; G01S 5/14
See application file for complete search history.

(56) References Cited

U.S. PATENT DOCUMENTS

| | | | | |
|---|---|---|---|---|
| 8,102,784 B1 * | 1/2012 | Lemkin | ..................... | G01S 5/10 |
| | | | | 370/255 |
| 2009/0054106 A1 * | 2/2009 | Antolovic | ................. | G01S 3/18 |
| | | | | 455/562.1 |
| 2018/0302188 A1 * | 10/2018 | Ciholas | ............... | H04W 56/004 |
| 2021/0076350 A1 * | 3/2021 | Yang | ................... | H04W 52/283 |
| 2022/0210620 A1 * | 6/2022 | Wahl | ................... | H04W 56/001 |
| 2022/0216892 A1 * | 7/2022 | Bollard | ................... | G01S 13/76 |
| 2022/0248310 A1 * | 8/2022 | Yamada | ................... | G01S 1/20 |
| 2023/0024348 A1 * | 1/2023 | Warnez | ................. | H04W 64/00 |
| 2025/0030451 A1 * | 1/2025 | Silverman | ............. | H04W 64/00 |
| 2025/0039827 A1 * | 1/2025 | Reddy | ................... | H04J 3/0661 |
| 2025/0251507 A1 * | 8/2025 | Henry | ..................... | H04W 4/02 |

FOREIGN PATENT DOCUMENTS

| | | | | | |
|---|---|---|---|---|---|
| DE | 102021101808 A1 * | 8/2021 | ......... | H04L 25/0212 |
| WO | WO-2021049749 A1 * | 3/2021 | .......... | H04W 64/006 |

* cited by examiner

*Primary Examiner* — Charles T Shedrick

(74) *Attorney, Agent, or Firm* — Martin IP Law Group; C. Richard Martin

(57) ABSTRACT

A system and method for using timing data from an incomplete packet to more accurately determine the position of a transmitter in a workspace is provided. A radio signal packet comprising a header portion containing timing data, and a data portion, is transmitted from a transmitter. Upon successful receipt by at least one receiver in a known location, header portions from incomplete receptions at other receivers are correlated to the transmission. Timing data from the correlated, and incomplete, receptions are then used by a location determining algorithm to improve position accuracy and extend the range of the system.

15 Claims, 6 Drawing Sheets

SYSTEM AND METHOD FOR USING TIMING DATA FROM AN INCOMPLETE PACKET TO MORE ACCURATELY DETERMINE THE POSITION OF A TRANSMITTER

BACKGROUND OF THE INVENTION

Field of the Invention

The present invention relates to systems and methods for locating the source of an ultra-wideband transmission having improved accuracy and range. More specifically, the present invention relates to a system and method for using the timing data from the header portion of a packet that does not include an accurate data portion to calculate the location of an ultra-wideband transmitter.

Description of the Related Art

As shown in FIG. 1, prior art systems for locating the source of an ultrawide transmission include an ultra-wideband transmitter 10 and a plurality of ultra-wideband receivers 12a, 12b, 12c 12d. The receivers 12a, 12b, 12c, 12d are located at fixed, known positions in a workspace and are in communication with a server 14 that processes data received from the receivers 12a, 12b, 12c, 12d to calculate the position of the transmitter 10. While FIG. 1 shows four (4) receivers 12a, 12b, 12c, 12d, the system will function with two or more receivers. The more receivers that are used in the system the more accurately the position of the transmitter is determined. Also, while FIG. 1 shows the receivers 12a, 12b, 12c, 12d hard wired to the server 14, it is within the scope of the invention to transmit the data wirelessly (see FIG. 3) from the receivers to the server by other means such as WiFi, Bluetooth or other wireless transmissions known now or in the future. The timing information from the receivers 12a, 12b, 12c, 12d is synchronized using known methods for time stamping the time of arrival (TOA) of packets.

As shown in FIG. 2, the packet 16 sent from the transmitter 10 over the airwaves consists of a header portion 16a and a data portion 16b. For typical UWB systems, the header portion 16a of the packet 16 is received at a much higher reliability than the data portion 16b of the packet 16. Furthermore, the header portion 16a contains all of the necessary information to do precision timing and phase determination. A header check 18 and separate data check 20 are embedded in the header portion 16a and data portion 16b, respectively. The timing and phase data only occur in the header portion 16a. The data portion 16b also includes whatever data or information that the sender wants to send, along with the tag identification data 22, which can be used by the server 14 to determine the particular transmitter from which a packet 16 is received.

The range at which a packet 16 can be fully received is limited by the data portion 16b. At a certain distance from the UWB transmitter 10, the data portion 16b of the packet 16 is not reliably received at the UWB receiver 12. The range at which the header portion 16a of the packet 16 is received is greater than the range at which the data portion 16b is reliably received. When a UWB receiver 12 only receives the header portion 16a and not the data portion 16b due to its distance from the transmitter 10, present systems consider this data to be unreliable and that information is not passed on to the server 14, but instead is discarded. This results in fewer data points from which to determine the location of a transmitter 10 because packets 16 with good header portions 16a and bad data portions 16b are discarded. The accuracy of the position calculation for transmitter 10 improves when more receivers 12 obtain timing and phase data.

Accordingly, there is a need for a system that can utilize the received header portion 16a of a packet 16 that does not include an accurate data portion 16b, and effectively use that timing information, which includes the time of arrival (TOA) and phase of arrival of the transmission, as a data point to increase both the accuracy and range of the system.

SUMMARY OF THE INVENTION

It is therefore an object of the present invention to provide a system and method for using the header portion of a transmission that does not include a complete data packet portion to provide an extra data point thus enabling more accurate location determination.

It is also an object of the invention to provide a system and method for using the header portion of a transmission that does not include a complete data packet portion to extend the range of the system.

The present invention meets these objects by providing a system and method wherein the header information from a transmission that does not include an accurate data packet can be used, where it normally would be discarded. The identity of the transmitter/transmission containing only the correct header can be determined by comparing the time of arrival of the transmission with the times of arrival of the same transmission at receivers where both the header and data packets were received.

According to one presently preferred embodiment of the invention, there is provided a method for using timing data from an incomplete packet to more accurately determine the position of a transmitter in a workspace. The method comprises the steps of: transmitting a radio signal packet from the transmitter, wherein the packet comprises a header portion which includes timing and phase data and a data portion which includes data and tag identification information; receiving the header portion and the data portion of the radio signal packet at a first receiver positioned in a fixed location within a first zone of the workspace, the first zone being defined by a radius from the transmitter where both the header portion and data portion of the radio signal packet are received; receiving the header portion but not the data portion of the radio signal packet at a second receiver positioned in a fixed location within a second zone of the workspace, wherein the second zone being defined by a first boundary associated with an outer boundary of the first zone and a second boundary defined by a radius from the transmitter where the header portion but not the data portion of the radio signal packet are received; transmitting at least the timing data from the header portion of the radio signal packet at the first receiver to a server; transmitting at least the timing data from the header portion of the radio signal packet at the second receiver to the server; and implementing a location determining algorithm using the timing data from the header portion of the radio signal from the first receiver and the timing data from the header portion of the radio signal from the second receiver to determine the location of the transmitter in the workspace.

The method may further include the steps of: recording receipt of the header portion and data portion of the radio signal packet at the first receiver; and recording receipt of the header portion of the radio signal packet at the second receiver.

The method may further include the steps of: identifying the transmitter associated with the radio signal packet at the first receiver by the tag identification data from the data portion of the packet; identifying the transmitter associated with the radio signal packet at the second receiver by comparing a time of arrival of the radio signal packet at first receiver to a time of arrival of the radio signal packet at the second receiver, and, if the time of arrival at the second receiver is within a certain range of the time of arrival at the first receiver, assigning tag identification data at the second receiver to match the tag identification data at the first receiver. The certain range of timing data may be +/−10 microseconds. The method may further comprise the step of substituting the data portion of the packet from the radio signal packet at the first receiver for the missing data portion of the packet from the radio signal packet at the second receiver if the time of arrival at the second receiver is within the certain range of the time of arrival at the first receiver. The steps of receiving and transmitting may be performed at a plurality of first receivers and a plurality of second receivers The method may further comprise the step of combining the data portions of the packets from the radio signal packets at each of the first receivers into a single data set for all receivers.

According to one embodiment of the invention, a plurality of transmitters that transmit at different times may be provided. In this embodiment, the method may further comprise the step of differentiating signals from each transmitter relative to the other transmitters.

According to another aspect of the invention, the steps of receiving and transmitting may be performed at a plurality of first receivers and a plurality of second receivers. A plurality of transmitters may be located remotely from one another that transmit at the same time. According to this aspect of the invention, the method may further comprise the step of spatial disambiguation to differentiate each transmitter from the other remote transmitters. According to another aspect of this embodiment, only packets received at receivers that are located in only one of the zones defined around plurality of transmitters are considered.

According to another aspect of the invention, transmissions may occur from each one of the plurality of transmitters at known regularly scheduled transmission times. According to this aspect, the method may further comprise the steps of: comparing the timing information from the header portion of the radio signal packet at each receiver within the first zone and second zone with the known transmission times for each transmitter; and correlating the timing information from the header portion of the radio signal packet at each receiver within the first zone and second zone with the known transmission times for each transmitter to determine from which of the plurality of transmitters the radio signal packet was transmitted.

Another aspect of the present invention is a system for using timing data from an incomplete packet to more accurately determine the position of a transmitter. The system according to this aspect may comprise: a radio signal packet transmitted from the transmitter, the packet comprising a header portion which includes timing and phase data and a data portion which includes data and tag identification information; a first receiver positioned in a fixed location within a first zone of the workspace, the first zone being defined by a radius from the transmitter where both the header portion and data portion of the radio signal packet are received; a second receiver positioned in a fixed location within a second zone of the workspace, the second zone being defined by a first boundary associated with an outer boundary of the first zone and a second boundary defined by a radius from the transmitter where the header portion but not the data portion of the radio signal packet are received; a server for receiving and processing at least the timing data from the header portion of the radio signal packet at the first receiver, and at least the timing data from the header portion of the radio signal packet at the second receiver; and a location determining algorithm using the timing data from the header portion of the radio signal from the first receiver and the timing data from the header portion of the radio signal from the second receiver, said algorithm implemented to determine the location of the transmitter in the workspace.

The system according to a further aspect of the invention may also comprise: means for recording receipt of the header portion and data portion of the radio signal packet at the first receiver; and means for recording receipt of the header portion of the radio signal packet at the second receiver.

According to yet a further embodiment of the invention, the system may further comprise: means for identifying the transmitter associated with the radio signal packet at the first receiver by the tag identification data from the data portion of the packet; and means for identifying the transmitter associated with the radio signal packet at the second receiver by comparing a time of arrival of the radio signal packet at first receiver to a time of arrival of the radio signal packet at the second receiver, and, if the time of arrival at the second receiver is within a certain range of the time of arrival at the first receiver, assigning tag identification data at the second receiver to match the tag identification data at the first receiver. The system may further comprise means for substituting the data portion of the packet from the radio signal packet at the first receiver for the missing data portion of the packet from the radio signal packet at the second receiver if the time of arrival at the second receiver is within the certain range of the time of arrival at the first receiver.

According to a further embodiment of the invention, the system may comprise a plurality of transmitters that transmit at different times and further comprising means for differentiating signals from each transmitter relative to the other transmitters.

The system may further include a plurality of transmitters located remotely from one another that transmit at the same time, and further comprising spatial disambiguation means to differentiate each transmitter from the other remote transmitters.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
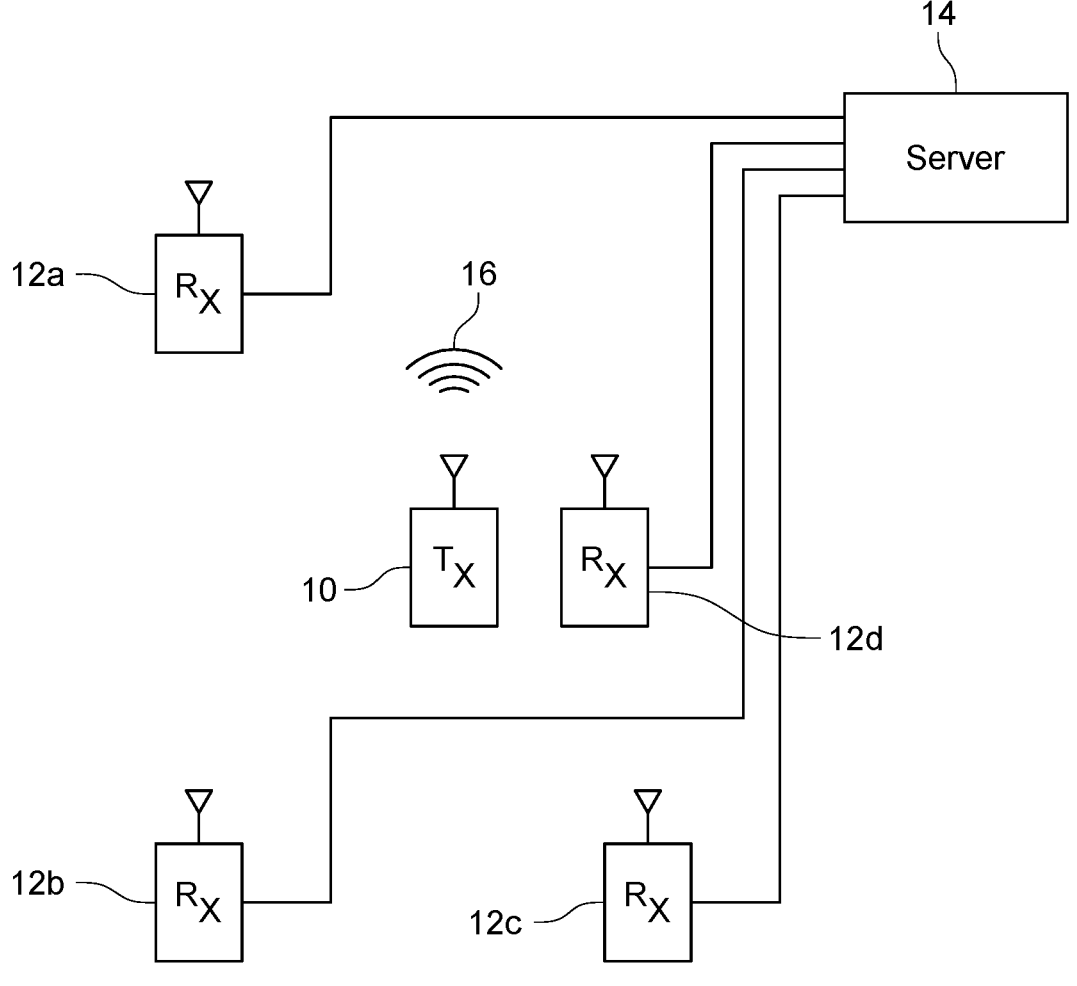
FIG. 1 shows a prior art depiction of an ultra-wideband transmitter and receiver system.
Figure 2:
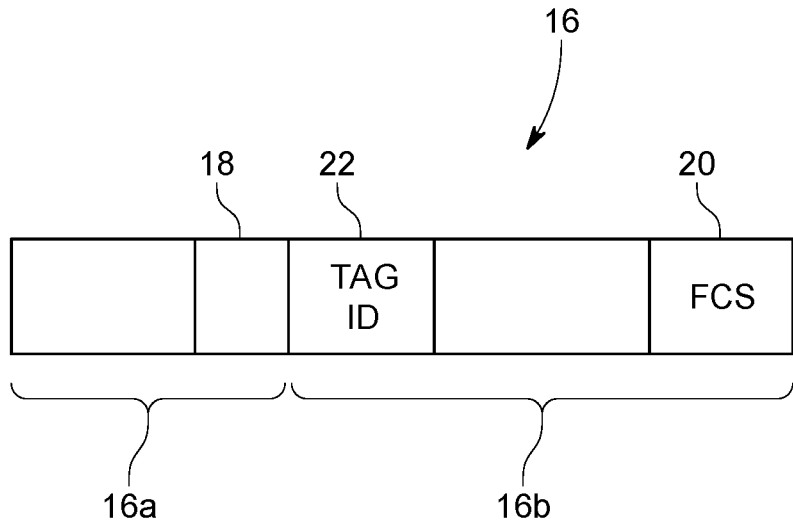
FIG. 2 shows a prior art ultra-wideband packet and the component parts of that packet.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 3:
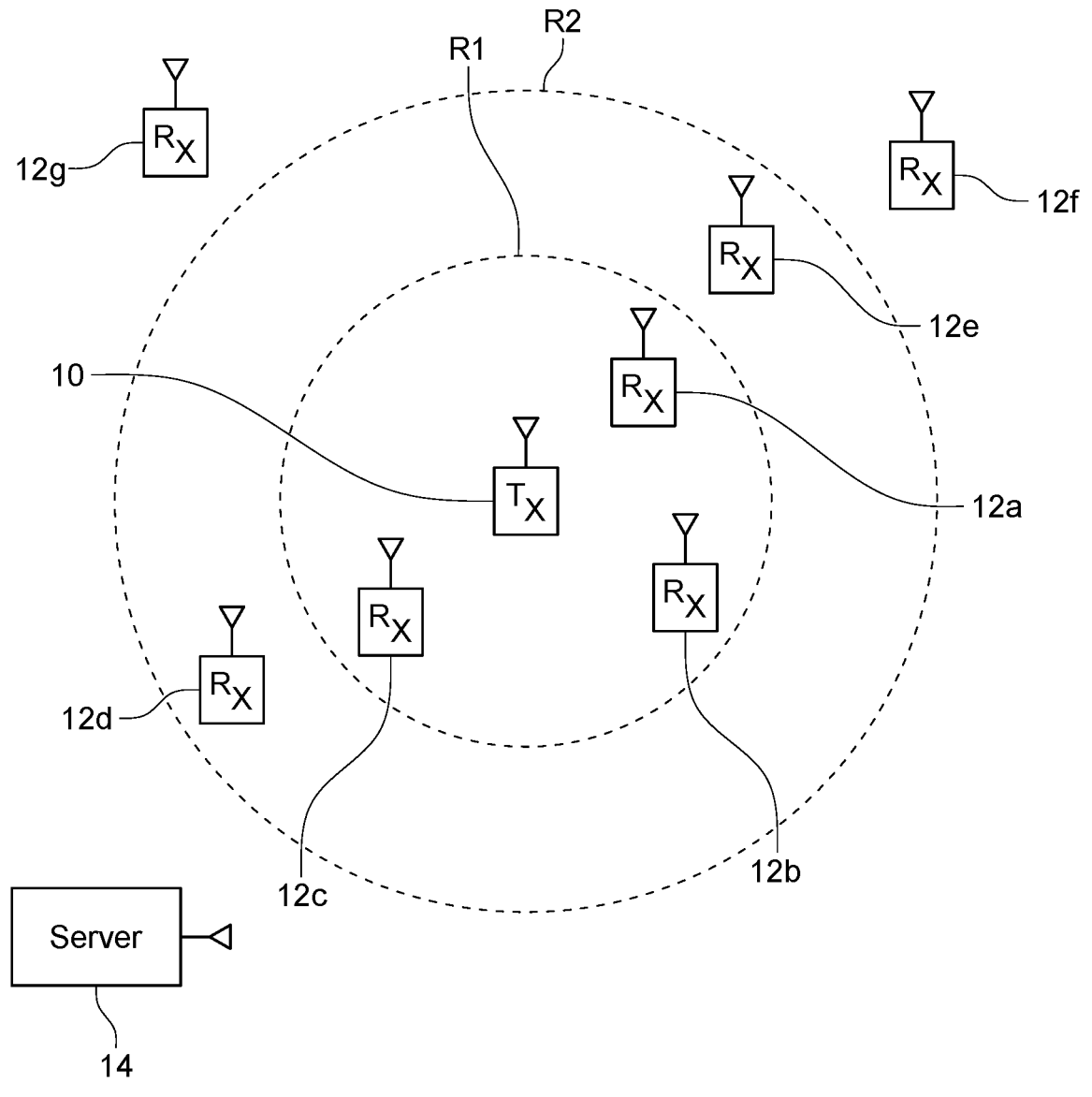
FIG. 3 shows a system according to an embodiment of the present invention where transmissions in a certain range do not include the data portion of a packet.

As best shown in FIG. 3, one presently preferred embodiment of the invention comprises a system comprising a transmitter 10 and a plurality of receivers 12*a*, 12*b*, 12*c*, 12*d*, 12*e*, 12*f*, 12*g*. When the transmitter 10 transmits, it is potentially received by all of the receivers 12*a*, 12*b*, 12*c*, 12*d*, 12*e*, 12*f*, 12*g*. But some of these receivers, for example receivers 12*f* and 12*g*, may be far away from the transmitter 10. Receivers closest to the transmitter 10, for example receivers 12*a*, 12*b*, 12*c*, are most likely to receive both the header portion 16*a* and data portion 16*b* of the packet 16 correctly. In that instance, receivers 12*a*, 12*b* and 12*c* will record that they each received the header portion 16*a* and data portion 16*b* of the packet 16, get the necessary timing information from the header portion 16*a*, and then will pass that timing information along to the server 14 which will compute the location of the transmitter 10 relative to each of the receivers 12*a*, 12*b*, 12*c*.

For receivers that are further away from the transmitter 10, for example receivers 12*d* and 12*e*, each receiver 12*d*, 12*e* may receive the header portion 16*a* correctly, but the data portion 16*b* of the packet 16 is corrupted or not received fully or correctly. In prior art systems, the receivers 12*d*, 12*e* would not transmit this incomplete data to the server 14. Therefore timing information from the header portion 16*a* of the packet 16 from receivers 12*d* and 12*e* would not be considered in calculating the location of the transmitter 10, because the data portion 16*b* of the packet 16 was not received correctly.

There are a number of methods for determining whether a packet has been received correctly that are currently known to those skilled in the art. One method is a frame check sequence (FCS), which refers to extra bits added to the frame for error detection. It is used for HDLC error detection. It is 2-byte or 4-byte field that is used to detect errors in the address field, control field, and information field of frames transmitted across the network. It is used to ensure the data frame is not corrupted by the transmission medium while sending it from sender to receiver. Another known method for determining whether a packet has been received correctly is Reed-Solomon encoding, which belongs to a RS code, and is a method of encoding that can fix node data loss. It has maximum distance separable (MDS) encoding properties. Its encoding and decoding rate outperforms conventional RS coding and optimum CRS coding. Other methods are also known and can be used to detect errors in the packet. There is a whole set of criteria to determine if a packet is good—it has to pass a series of check sums, encoding, and other programmed criteria.

Systems currently in use only pass on the packet information to the server if all of the criteria are met indicating that the entire packet, header and packet, are free of errors. The present invention requires separate check sequences for the header portion 16*a* and data portion 16*b* of the packet 16, but does not require nor depend on any particular error detection method discussed here or otherwise known in the art. Furthermore, the present invention does not necessarily require that the frame checking be done prior to sending it to a server. It is within the scope of the invention to send all data to a server and perform the frame checking and evaluation at the server. The present invention concerns timing information being used by the 'location algorithm'. While the 'location algorithm' may be described herein as residing in a server connected to the system, the location engine could potentially live in one of receivers eliminating the need for a separate server.

Some receivers such as receivers 12*c* and 12*b* are located within a certain range R1 from the transmitter 10, are near enough to the transmitter 10 that the full packet 16 is received without error for both the header portion 16*a* and data portion 16*b*. In those instances, the packet 16 including the timing information from the header portion 16*a* and other data from the data portion 16*b* is sent to the server 14. The server 14 takes the timing information from the header portion 16*a* of the packet 16, and computes the location of the transmitter 10 given the data from the receivers 12*a*, 12*b*, 12*c*. According to this aspect of the invention, and as in prior art systems, within the data portion 16*b* of the packet 16 is the tag ID information 22 that tells the receivers 12, and ultimately the server 14, which transmitter, in this instance transmitter 10, transmitted the packet. Other data such as battery voltage, sensor data or other pertinent information can be carried in the data portion 16*b* of the packet 16.

There is further a second zone or range R2 from the transmitter 10, where the header portion 16*a* of the packet 16 is received correctly at the receivers in the range, in this case receivers 12*d* and 12*e*, but the data portion 16*b* of the packet 16 is not. The distance to the outer perimeter of the second zone R2 is greater than the distance to the outer perimeter of the first zone R1, and in some exemplary systems can be about twice the distance, meaning that if for example a full transmission including the header portion 16*a* and data portion 16*b* of a packet 16 can be received accurately at a distance of 50 meters, the header portion 16*a* can be received at a distance of about 100 meters. This exemplary system could effectively extend the range/area of coverage by 4 times if the transmissions in this second range R2 were not discarded because of the bad data packets 16*b*.

For receivers outside the second zone R2, for example receivers 12*f* and 12*g*, both the header portion 16*a* and data portion 16*b* of the packet 16 are not received correctly, and that packet is likewise discarded and not passed along to the server 14 for processing.

Figure 5:
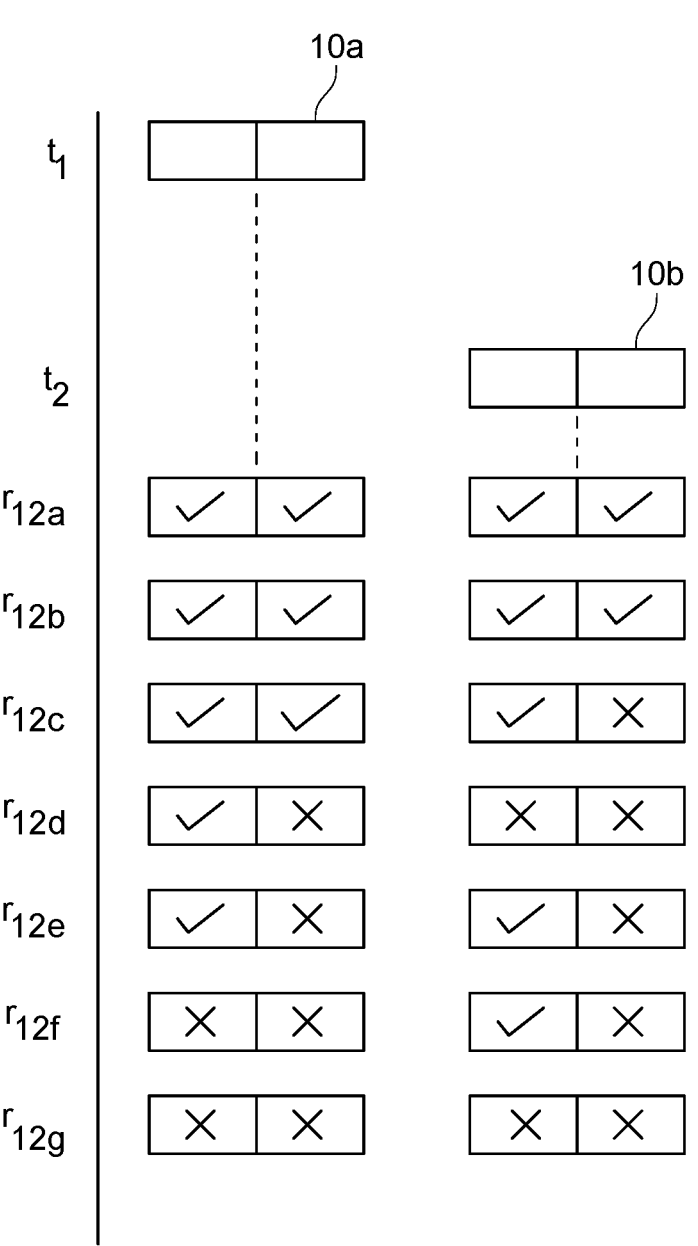
FIG. 5 shows whether timing data was received for transmissions from the tags T1 and T2 shown in FIG. 4.

As best shown in FIG. 5, the present invention provides a system and method whereby timing information from the header portion 16*a* of a packet 16 that is received by receivers 12*d*, 12*e* in the second zone R2, are not discarded, but are passed along to the server 14 and used to calculate the location of the transmitter 10 more precisely. In the example shown in FIG. 3, the server 14 will receive good header portions 16*a* and good data portions 16*b* for packets 16 from receivers 12*a*, 12*b*, 12*c*, good header portions 16*a*, but bad data portions 16*b* from receivers 12*d* and 12*e*, and no packet 16 (neither header portion 16*a* nor data portion 16*b*) from receivers 12*f* and 12*g*. In cases where the tag ID 22 is included in the data portion 16*b* of the packet 16, and the receiver 12d, 12e does not receive the data portion 16b of the packet 16, the server 14 does not receive the tag ID information 22 and cannot immediately identify which transmitter the packet came from.

The present invention collects data from all receivers that receive the header portion 16a, but not the data portion 16b of the packet 16 and uses the timing information from those header portions 16a, along with the timing data 16a from the packets 16 received by receivers 12a, 12b, 12c, in range R1, to determine from which of the plurality of transmitters the radio signal packet was transmitted. Once the particular transmitter from which the signal was transmitted has been identified, further algorithms can be run to determine the position of the transmitter. The invention considers the timing data from the header portion 16a of the packet 16 from the transmitter 10 at each of the receivers 12a, 12b, 12c, 12d and 12e. For the example shown in FIG. 3, we know the tag ID is for transmitter 10 at receivers 12a, 12b, 12c because both the header portion 16a and data portion 16b, which includes the tag ID 22, of the packet 16 were both received. However, at receivers 12d and 12e, the tag ID from the packet 16 received from the transmitter 10 is missing because the data portion 16b was not received. If the time of arrival (TOA) of the header portion 16a of the packet 16 at receivers 12d and 12e is within a certain range (e.g. +/−10 microseconds) relative to the times of arrival of the packet 16 from transmitter 10 at receivers 12a, 12b and 12c, it can be assumed that the tag ID 22 for that packet 16 originated from transmitter 10. Because the time of arrival window is short relative to the length of a packet, there is a high assurance that the packet 16 came from transmitter 10.

Since the server 14 accepts the data from receivers 12d and 12e, and is able to identify that the packet 16 came from transmitter 10, there is timing information from the header portion 16a at five different receivers 12a, 12b, 12c, 12d, 12e that can be used to calculate the location of transmitter 10 instead of the three receivers 12a, 12b, 12c that would have been used in prior art methods. By relying on five data sets instead of three, the location of the transmitter 10 can be more precisely determined. In addition, the effective range of the system is significantly extended beyond range R1, which is typical in prior art systems, to include data from receivers in an extended range R2.

Because we now know that the packets received at receivers 12d and 12e in the second zone R2 were transmitted from the same transmitter 10 and are the same as the packets received at receivers 12a, 12b and 12c in the first zone R1, the sever can substitute the data portion 16b for one of the packets that was fully received at receivers 12a, 12b, 12c for the missing data portion 16b of the packet 16 received at receivers 12d, 12e, or, alternatively, the server 12 combines the data from all receivers 12a, 12b, 12c, 12d, 12 into a single data set.

Figure 4:
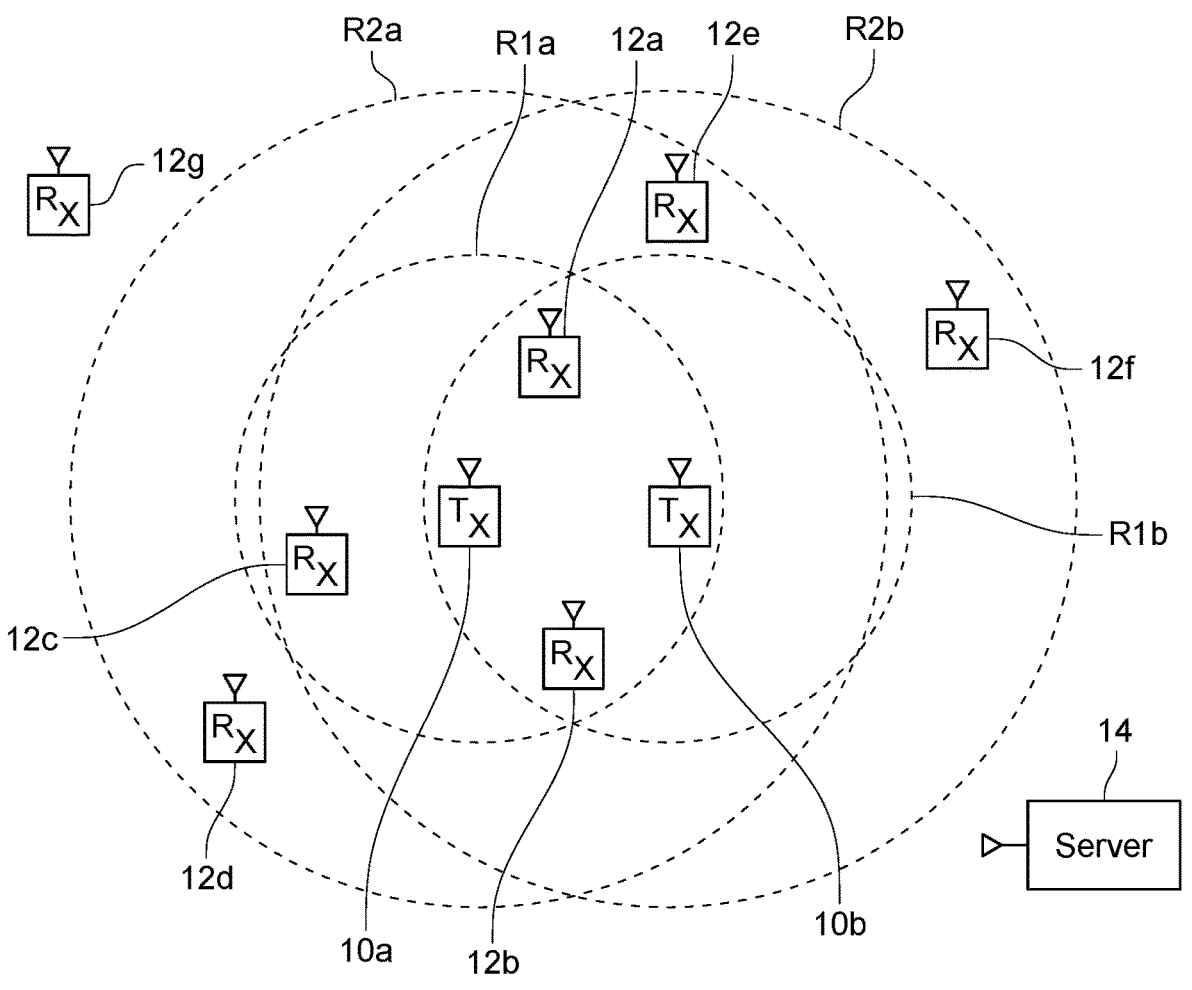
FIG. 4 shows a system like that shown in FIG. 3, but with two transmitters.

FIG. 4 shows an example of the system of the invention wherein two transmitters 10a, 10b are both in the system and transmitting. Assuming transmitter 10a transmits at a time other than exactly when transmitter 10b transmits (e.g. 100 microseconds later) the system can differentiate signals from transmitter 10a and transmitter 10b even at receivers that don't receive the data portion 16b, which includes the tag ID 22, of the packet 16.

FIG. 5 is a timing diagram showing the transmissions (t1, t2) and reception (r12a, r12b, r12c, r12d, r12e, r12f, r12g) of the packets 16 including header portions 16a and data portions 16b, from transmitters 10a and 10b. Transmitter 10a transmits at time t1 and the transmission is received at each of the receivers within 1 microsecond. The header portion 16a and packet portion 16b are both received at receivers 12a, 12b, 12c as indicated. The header portion 16a, but not the packet portion 16b is received at receivers 12d and 12e, and neither the header nor data portion is received at receivers 12f and 12g. Similarly, transmitter 10b transmits at time t2 and that transmission is received at each of the receivers within 1 microsecond. The header portion 16a and packet portion 16b are both received at receivers 12a and 12b as indicated. The header portion 16a, but not the packet portion 16b is received at receivers 12c, 12e and 12f, and neither is received at receivers 12d and 12g.

The present invention allows for a system to be less dense. Fewer receivers are required to get the same results because the range of the system is expanded to include receivers that are in the region R2 where header portions 16a are received and packet portions 16b are not received. Fewer receivers in a system means less cost, potentially on a magnitude of 3× to 4×. Alternatively, the same number of receivers can be used in a system, but the system will have more data points to draw from thus increasing the precision of the location information.

Figure 6:
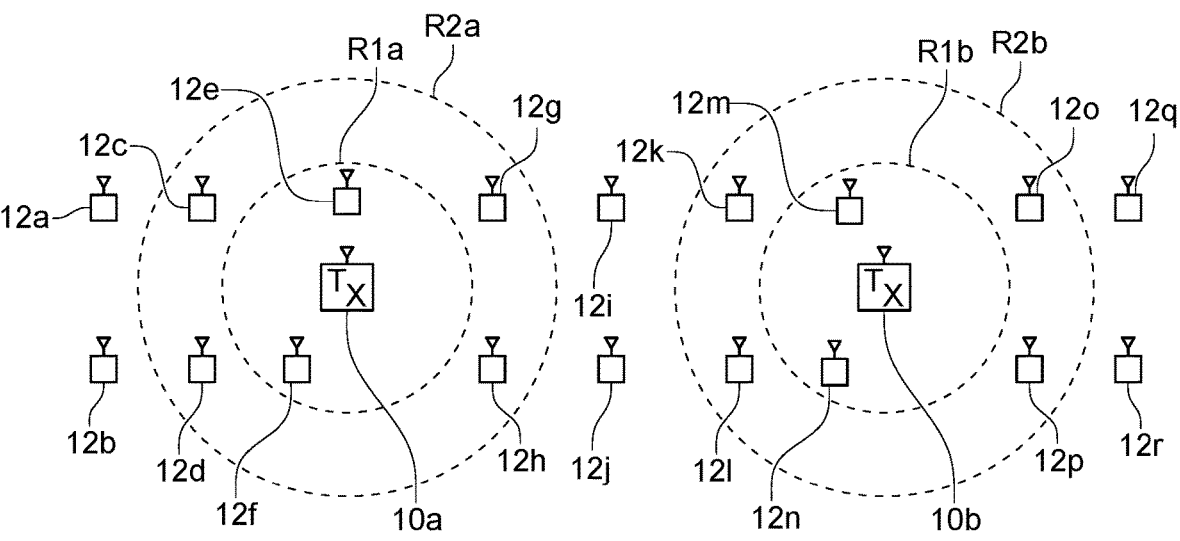
FIG. 6 shows the system of FIG. 3 along with a similar system located a distance away that allows for spatial disambiguation.

In larger systems, spatial disambiguation may also be used to identify and locate a transmitter and differentiate it from a remote transmitter that transmits at the same time. As shown in FIG. 6, transmitter 10b may be at a location that is remote from the location of transmitter 10a. When transmitter 10a transmits, both the header portion and data portion of the packet are received at receivers 12e and 12f, and the header portion, but not the data portion of the packet is received at receivers 12c, 12d, 12g and 12h. The transmission from transmitter 10a is not received at the group of receivers 12a and 12b, 12i-12r. When transmitter 10b transmits, both the header portion and data portion of the packet are received at receivers 12m and 12n, and the header portion, but not the data portion of the packet is received at receivers 12k, 12l, 12o and 12p. The transmission from transmitter 10b is not received at the group of receivers 12a-12j, 12q and 12r.

In this scenario, spatial disambiguation can be used to differentiate transmitter 10a from transmitter 10b, even if they transmit at the same time. Only receivers that are in precisely one (not zero and not two) inclusion zone are considered. Considering FIG. 6, there are no receivers that are in two zones, and receivers 12a, 12b, 12i, 12j, 12q and 12r are in no zones, and therefore data from those receivers are not used to spatially disambiguate the transmitters. However, if transmitter 10a were located further to the right between receivers 12i and 12j, receivers 12k and 12l would be located in two inclusion zones (R2a, R2b) and receivers 12a-12f, 12q and 12r are not in any inclusion zone. In this scenario, receivers 12a-12f, 12k, 12l, 12q and 12r would not be used to disambiguate transmitter 10a from transmitter 10b.

Because the receivers 12a-12r are in fixed locations, there positions relative to one another are known. Therefore, in the example shown in FIG. 6, it can be determined that the packet received at receivers 12c, 12d, 12g and 12h originated from transmitter 10a because of their known proximity to receivers 12e and 12f, which received both header portions and data portions of the packet from transmitter 10a. Likewise, it can be determined that the packet received at receivers 12k, 12l, 12o and 12p originated from transmitter 10b because of their known proximity to receivers 12m and 12n, which received both header portions and data portions of the packet from transmitter 10b.

The system is designed to function so long as a header portion 16a and a data portion 16b of a packet 16 transmitted from a transmitter 10 is received at at least one receiver. The timing information from the other receivers can be used to correlate the signal at those receivers with the signal at the receiver where both the header and data portions of the packet were received. Once correlated, the time portion 16*a* from the packet at each of the receivers can then be utilized to better determine the position of the transmitter.

In a scheduled system where transmission from transmitters occur at regularly scheduled intervals, it is possible to calculate the position of a transmitter even if none of the receivers receive both the header portion 16*a* and data portion 16*b* of the packet 16. In this embodiment, instead of comparing the timing information of packets without a data portion to those where both the header and data portions were received, the timing information from the header portion at each receiver is compared to the known transmission time for that transmitter and correlated to that known transmission time to determine from which of the plurality of transmitters the radio signal packet was transmitted. Once the particular transmitter from which the signal was transmitted has been identified, further algorithms can be run to determine the position of the transmitter. Further, in such a scheduled system, it is possible to cut off the data portion of the packet from the transmission and send only the header portion. The advantage to doing this is to shorten the package, which takes less airtime and allows more transmissions. If location is the only concern and the data in the packet is unnecessary, this avoids wasting airtime.

The system according to the first embodiment processes between about 3,000 and 3,400 locates per second. This is based on allocating about 200-220 microseconds for the allocation of the transmission that includes a header and a data packet, plus dead time for turn around and processing. With the data packet removed, only the header, which is around 70 microseconds in length, remains, which allows for a 100 microsecond window instead of the normal 200-220 microsecond window. That could potentially increase the rate to 10,000 locates per second.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A method for using timing data from an incomplete packet to more accurately determine the position of a transmitter in a workspace comprising the steps of:

a. transmitting a radio signal packet from said transmitter, said packet comprising a header portion which includes timing data and a data portion which includes data and tag identification information;

b. receiving said header portion and said data portion of said radio signal packet at a first receiver positioned in a known location within a first zone of the workspace, said first zone being defined by a radius from the transmitter where both the header portion and data portion of the radio signal packet are received;

c. receiving said header portion but not said data portion of said radio signal packet at a second receiver positioned in a known location within a second zone of the workspace, said second zone being defined by a first boundary associated with an outer boundary of the first zone and a second boundary defined by a radius from the transmitter where the header portion but not the data portion of the radio signal packet are received;

d. transmitting at least the timing data from the header portion of the radio signal packet at the first receiver to a server;

e. transmitting at least the timing data from the header portion of the radio signal packet at the second receiver to the server;

f. implementing a location determining algorithm using the timing data from the header portion of the radio signal from the first receiver and the timing data from the header portion of the radio signal from the second receiver to determine the location of the transmitter in the workspace.

2. The method of claim 1 further comprising the steps of:

a. identifying the transmitter associated with the radio signal packet at the first receiver by the tag identification data from the data portion of the packet;

b. identifying the transmitter associated with the radio signal packet at the second receiver by comparing a time of arrival of the radio signal packet at first receiver to a time of arrival of the radio signal packet at the second receiver, and, if the time of arrival at the second receiver is within a certain range of the time of arrival at the first receiver, assigning tag identification data at the second receiver to match the tag identification data at the first receiver.

3. The method of claim 2 wherein the certain range of timing data is +/−10 microseconds.

4. The method of claim 2 further comprising the step of substituting the data portion of the packet from the radio signal packet at the first receiver for the missing data portion of the packet from the radio signal packet at the second receiver if the time of arrival at the second receiver is within the certain range of the time of arrival at the first receiver.

5. The method of claim 2 wherein the steps of receiving and transmitting are performed at a plurality of first receivers and a plurality of second receivers, and further comprising the step of combining the data portions of the packets from the radio signal packets at each of the first receivers into a single data set for all receivers.

6. The method of claim 1 wherein there are a plurality of transmitters that transmit at different times and further comprising the step of differentiating signals from each transmitter relative to the other transmitters.

7. The method of claim 1 wherein the steps of receiving and transmitting are performed at a plurality of first receivers and a plurality of second receivers.

8. The method of claim 7 wherein there are a plurality of transmitters located remotely from one another that transmit at the same time, and further comprising the step of spatial disambiguation to differentiate each transmitter from the other remote transmitters.

9. The method of claim 8 wherein only packets received at receivers that are located in only one of the zones defined around plurality of transmitters are considered.

10. The method of claim 6 wherein transmissions from each one of said plurality of transmitters occur at known regularly scheduled transmission times and further comprising the steps of:

a. comparing the timing information from the header portion of the radio signal packet at each receiver within the first zone and second zone with the known transmission times for each transmitter; and b. correlating the timing information from the header portion of the radio signal packet at each receiver within the first zone and second zone with the known transmission times for each transmitter to determine from which of the plurality of transmitters the radio signal packet was transmitted.

11. A system for using timing data from an incomplete packet to more accurately determine the position of a transmitter comprising:

a. a radio signal packet transmitted from said transmitter, said packet comprising a header portion which includes timing data and a data portion which includes data and tag identification information;

b. a first receiver positioned in a known location within a first zone of the workspace, said first zone being defined by a radius from the transmitter where both the header portion and data portion of the radio signal packet are received;

c. a second receiver positioned in a known location within a second zone of the workspace, said second zone being defined by a first boundary associated with an outer boundary of the first zone and a second boundary defined by a radius from the transmitter where the header portion but not the data portion of the radio signal packet are received;

d. a server for receiving and processing at least the timing data from the header portion of the radio signal packet at the first receiver, and at least the timing data from the header portion of the radio signal packet at the second receiver;

e. a location determining algorithm using the timing data from the header portion of the radio signal from the first receiver and the timing data from the header portion of the radio signal from the second receiver, said algorithm implemented to determine the location of the transmitter in the workspace.

12. The system of claim 11 further comprising:

a. means for identifying the transmitter associated with the radio signal packet at the first receiver by the tag identification data from the data portion of the packet;

b. means for identifying the transmitter associated with the radio signal packet at the second receiver by comparing a time of arrival of the radio signal packet at first receiver to a time of arrival of the radio signal packet at the second receiver, and, if the time of arrival at the second receiver is within a certain range of the time of arrival at the first receiver, assigning tag identification data at the second receiver to match the tag identification data at the first receiver.

13. The system of claim 12 further comprising means for substituting the data portion of the packet from the radio signal packet at the first receiver for the missing data portion of the packet from the radio signal packet at the second receiver if the time of arrival at the second receiver is within the certain range of the time of arrival at the first receiver.

14. The system of claim 10 wherein there are a plurality of transmitters that transmit at different times and further comprising means for differentiating signals from each transmitter relative to the other transmitters.

15. The system of claim 10 wherein there are a plurality of transmitters located remotely from one another that transmit at the same time, and further comprising spatial disambiguation means to differentiate each transmitter from the other remote transmitters.

\*   \*   \*   \*   \*